United States Patent
Del Prado Pavon et al.

(10) Patent No.: US 8,553,657 B2
(45) Date of Patent: Oct. 8, 2013

(54) SYSTEM AND METHOD TO ENABLE WUSB APPLICATION IN A DISTRIBUTED UWB MAC

(75) Inventors: Javier Del Prado Pavon, Ossining, NY (US); Sai Shankar Nandagopalan, Tarrytown, NY (US); Kiran Challapali, New City, NY (US); Joerg Habetha, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 1173 days.

(21) Appl. No.: 10/598,647

(22) PCT Filed: Mar. 4, 2005

(86) PCT No.: PCT/IB2005/050820
§ 371 (c)(1),
(2), (4) Date: Sep. 7, 2006

(87) PCT Pub. No.: WO2005/088915
PCT Pub. Date: Sep. 22, 2005

(65) Prior Publication Data
US 2007/0189244 A1    Aug. 16, 2007

Related U.S. Application Data

(60) Provisional application No. 60/551,146, filed on Mar. 8, 2004, provisional application No. 60/587,559, filed on Jul. 13, 2004.

(51) Int. Cl.
H04W 4/00    (2009.01)
(52) U.S. Cl.
USPC .......... 370/338; 370/345; 370/346; 370/347; 370/328

(58) Field of Classification Search
USPC .......... 370/388, 344, 345, 346, 347, 348; 455/435.1, 435.2, 435.3
See application file for complete search history.

(56) References Cited

U.S. PATENT DOCUMENTS

| | | | |
|---|---|---|---|
| 2003/0012176 A1* | 1/2003 | Kondylis et al. | 370/348 |
| 2003/0083095 A1* | 5/2003 | Liang | 455/552 |
| 2003/0086388 A1* | 5/2003 | Peters et al. | 370/328 |
| 2004/0047319 A1* | 3/2004 | Elg | 370/338 |
| 2004/0264428 A1* | 12/2004 | Choi et al. | 370/338 |
| 2005/0052995 A1* | 3/2005 | Gu et al. | 370/230 |
| 2005/0169292 A1* | 8/2005 | Young | 370/432 |
| 2008/0013510 A1* | 1/2008 | Salokannel et al. | 370/338 |

FOREIGN PATENT DOCUMENTS

JP    2005519354    6/2005

OTHER PUBLICATIONS

IEEE Standard for Information technology; Part 15.3: Wireless Medium Access Control (MAC) and Physical Layer (PHY) Specifications of High Rate Wireless Personal Area Networks (WPANs), Sep. 29, 2003. Kolic, Rafael, "Wireless USB Brings Greater Convenience and Mobility to Devices", Feb. 2004, pp. 1-7.
"MBOA Wireless Medium Access Control (MAC) Specification for High Rate Wireless Personal Area Networks (WPANS)", Technical Specification, MBOA MAC Specification Draft 0.5, Apr. 2004.

* cited by examiner

Primary Examiner — Kathy Wang-Hurst
(74) Attorney, Agent, or Firm — Larry Liberchuk

(57) ABSTRACT

A system and method is provided for incorporating host-device communication in wireless USB (WUSB). A host (101) either uses a multicast Distributed Reservation Protocol (DRP) frame on behalf of connected devices (102) to reserve wireless channel resources, a unicast DRP frame or Enhanced Distributed Channel Access (EDCA) with a Poll Frame. In the case of a unicast DRP frame the number of unicast frames sent for reservation depends on the number of connected devices (102).

34 Claims, 4 Drawing Sheets

SYSTEM AND METHOD TO ENABLE WUSB APPLICATION IN A DISTRIBUTED UWB MAC

CROSS REFERENCE TO RELATED APPLICATION

This application claims the benefit of U.S. provisional application Ser. No. 60/551,146 filed Mar. 8, 2004 and U.S. provisional application Ser. No. 60/587,559 filed Jul. 13, 2004, both of which are incorporated herein in whole by reference.

The present invention relates to a system and method for enabling wireless universal serial bus applications in a distributed ultra wide-band MAC.

Universal serial bus (USB) technology is a popular and effective high-speed wired connection type for PCs that is migrating into the areas of consumer electronics (CE) and mobile devices. The next generation of USB technology is wireless USB (WUSB) and will provide the functionality of wired USB without the inconvenience of wires and will be based on ultra wideband UWB radio.

Referring now to FIG. 1, the typical or fundamental topology of WUSB is a hub- and spoke-architecture comprising a host 101 and at least one connected device 102. In this architecture, all traffic 103 is initiated by the host 101 to its at least one connected device 102, by allotting time slots and data bandwidth to each connected device 102.

The relationship between a host 101 and its at least one connected device 102 is termed a cluster. The connections are point-to-point between a WUSB host 101 and its at least one connected WUSB device 102.

A WUSB host 101 can logically connect to a maximum of 127 WUSB devices 102, considered an informal WUSB cluster. WUSB clusters coexist within an overlapping spatial environment with minimum interference, thus allowing a number of other WUSB clusters to be present within the same radio cell.

The WUSB architecture supports dual roles for a device 102 wherein a device 102 can also provide limited host capabilities. In this dual role model, such a device/host can avail itself of the services of a central host 101 (i.e., printers) and can create a second cluster providing services itself as a host for accessing data outside any existing cluster it is connected to. This architecture supports high spatial capacity in small areas so that multiple devices have concurrent access to high bandwidth.

In a wireless USB (WUSB) scenario there is one host 101 and one or more devices 102 that transmit data to the host. In the wired USB scenario the host sends a token or a poll frame to the devices to request data from the devices. It is expected that WUSB will use UWB MBOA MAC as a means to communicate between a host 101 and connected devices 102 over the wireless medium, see MBOA Wireless Medium Access Control (MAC) Specification For High Rate Wireless Personal Area Networks (WPANs), Technical Specification, Draft 0.5, April 2004, which is hereby incorporated by reference as if fully set forth herein. Since the UWB MBOA MAC is distributed, there needs to be a method by which a host can reserve channel 1 resources on behalf of connected devices 102 so that connected devices 102 can transmit data when requested by the host 101.

In the MBOA MAC specification the medium can be reserved by means of the "Distributed Reservation Protocol" (DRP). This protocol comprises two mechanisms of negotiating a reservation of channel time: an explicit negotiation by means of dedicated command frames, and an implicit negotiation by inclusion of the DRP Information Elements (IEs) in the beacon of sender and receiver's. In both cases, once the reservation is established, the reservation information is included in the beacon of sender as well as receiver(s) in every superframe, in which the reservation is still active. This is necessary in order to inform neighboring devices of sender and receiver(s) about the existing reservation. These neighboring devices have to store the reservation information received and abstain from medium access during the reserved period of time.

DRP reservations can be unicast or multicast reservations between two, respectively a group of devices.

Thus, there is a need for a system and method for UWB MAC to reserve wireless channel resources so that connected devices 102 can send data to a host 101.

The present invention is based on a distributed UWB MBOA MAC that uses distributed reservation protocol (DRP) to exchange both isochronous and asynchronous data. That is, the present invention relates to data transfer between connected devices 102 and a host 101 that use the DRP protocol. The present invention provides a system and method for incorporating DRP-based host-device communication in wireless USB (WUSB).

In a first embodiment, the host 101 uses a multicast DRP (distributed reservation protocol) frame on behalf of connected devices 102 to reserve wireless channel resources for data transfer between the host 101 and connected devices 102 based on connected device characteristics and what traffic they have.

In the second embodiment the host 101 sends a unicast DRP frame to a connected device 102 and negotiates the use of channel resources for data transfer between the connected device 102 and the host 101.

In a third embodiment the host 101 sends a Poll frame to a connected device 102 to trigger the transmission from said device 102.

Thus, the present invention is a system and method for a distributed MAC protocol that provides a solution to incorporate WUSB data transfer therein.

Other features and advantages of the present invention will be obvious from the following drawings and detailed description of the invention.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the present invention.

Figure 1:
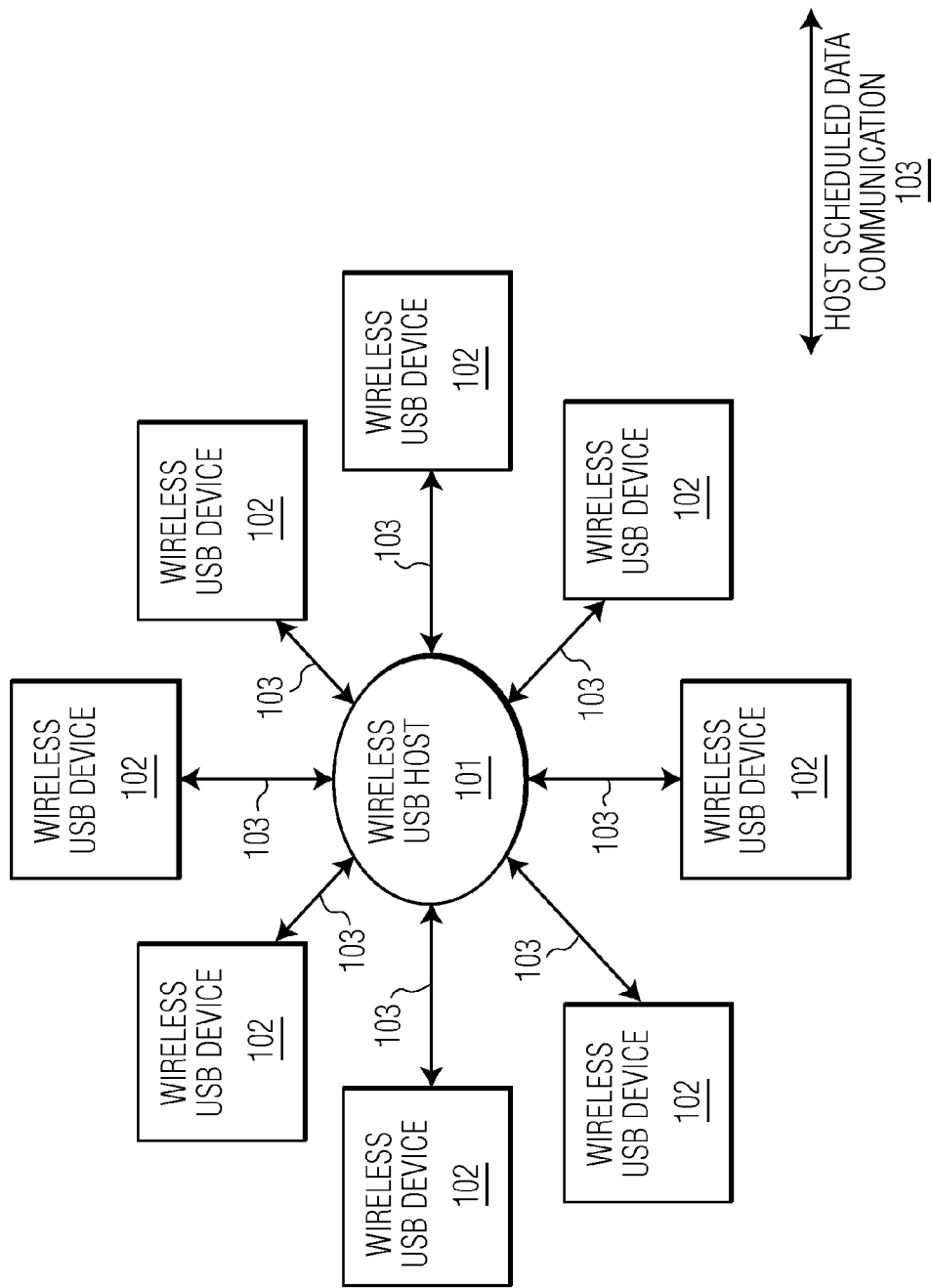
FIG. 1 illustrates a typical hub-and-spoke WUSB architecture.

The present invention provides a system and method for incorporating the host-device communication in wireless USB (WUSB). Referring now to FIG. 1, in a WUSB scenario there is one host 101 and one or more connected devices 102 that transmit data to the host 101. In the wired USB scenario the host sends a token or a poll frame to the devices to request data from the devices. WUSB could use UWB MBOA MAC as a means to communicate to other devices over the wireless medium. The UWB MBOA MAC is distributed and the present invention provides a system and a method by which a host 101 can reserve channel resources on behalf of connected devices 102 so that connected devices 102 can transmit data when requested by the host. That is, the present invention is a system and method for reserving wireless channel resources so that connected devices 102 can send data to a host 101.

Figure 2:
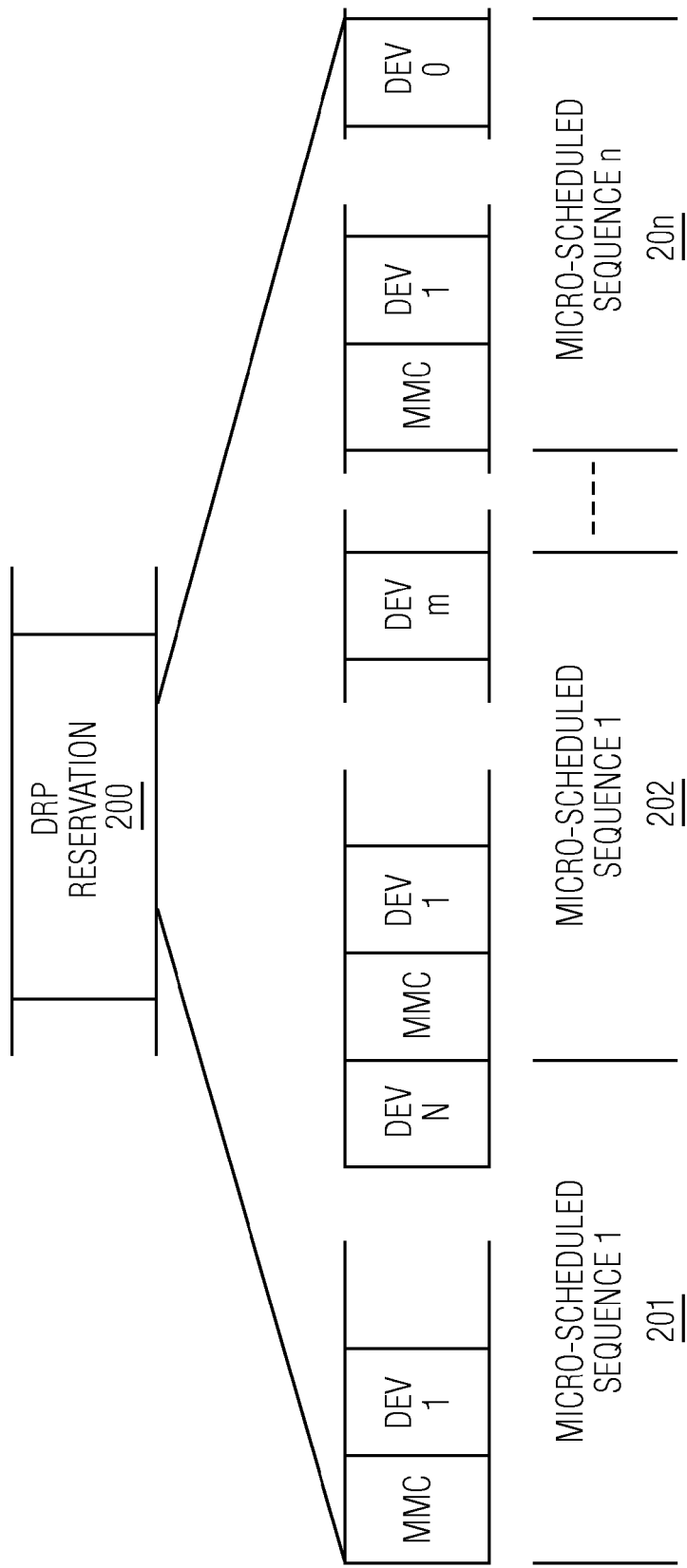
FIG. 2 illustrates a micro-scheduled DRP reservation according to the WUSB Working Group standard.

In a first embodiment, a host 101 of a WUSB initiates a multicast DRP frame to reserve wireless channel resources with/on behalf of at least one WUSB device 102 connected thereto. Each of the at least one device 102 that is connected to the host 101 communicates device 102 characteristics to the host 101 that are used by the host 101 to reserve wireless channel capacity on behalf of the at least one device 102. One advantage of this embodiment is that the overhead of reservation is very low, since the multicast reservation is done for multiple devices. In addition, a combined reservation by the host results in there being only one contiguous time period for the host 101 to receive data from the at least one device 102. In this first embodiment, the contiguous time period is scheduled for the at least one device using a protocol called micro-scheduling. The micro-scheduling protocol is defined in the "WUSB Key Developers, USB-IF, *WUSB Micro-scheduling Specification, Revision* 0.5*c*, December 2003", which is hereby incorporated by reference in its entirety and is illustrated in FIG. 2. Micro-scheduling adds an efficient and extensible medium allocation mechanism for applications that require lower latency and finer grained bandwidth control. Under Micro-scheduling, the host reallocates the channel time within a DRP reservation on an intra-superframe basis. This allows the devices to rapidly and efficiently change the amount of channel time allocated to other devices that are aware of and permitted to use the DRP reservation. The group using micro-scheduling is called a micro-scheduled cluster. The devices within the cluster that allocates the use of the medium within the micro-scheduled DRP reservation is called the Micro-Scheduled Cluster Controller (MSCC).

Thus, the multicast DRP protocol of the present invention is a way to incorporate into UWB MAC the existing micro-scheduling scheme of the WUSB specification. The disadvantage of this scheme is that the host 101 must perform another multicast reservation or perform a unicast reservation for those devices 102 that did not agree with the initial multicast reservation.

In a second embodiment, the host 101 initiates a separate unicast DRP reservation to the at least one device 102 to reserve channel resources. In this second embodiment, the number of reservation frames that need to be sent on the channel is directly proportional to the number of devices 102 connected to the host 101. This reservation initiation is equivalent to the micro-scheduled management command (MMC) of the current WUSB specification. Once the reservation is made, the host 101 uses a poll frame to request the at least one device 102 to transmit data during the reserved period. Advantages of the second embodiment include (1) it is a natural extension of DRP and (2) WUSB devices can be very simple. However, higher DRP negotiation overhead is incurred (depending on the number of WUSB devices). And, because DRP reservations may be spread through a superframe, this second embodiment may be less efficient than the micro-scheduling used by the first embodiment.

In a third embodiment, for WUSB transmissions that do not require DRP, the poll frame may also be sent by the host 101 using the EDCA channel access, that has control of the medium for a time specified by the EDCA TXOP limit, to request that the at least one device transmit data. The third embodiment has the advantage of flexibility and does not require devices to support and implement DRP mechanisms. However, EDCA is a contention-based access and there are no guarantees against delays.

For each embodiment, the host 101 must know the capabilities of the at least one device 102. These capabilities are included by the at least one device 102 when the at least one device 102 transmits a Beacon. The host 101 also includes the host 101 capabilities in a Beacon. In each embodiment, the devices 102 announce if traffic is pending to the WUSB host 101. In each embodiment, WUSB device notification traffic can use a DRP reservation or device notification traffic can be sent using EDCA or using some signaling in the beacon frames.

WUSB host discovery is done via a Beacon in which the host includes its capabilities.

In order to achieve better packing and facilitate implementation, the Offset and Duration fields of a DRP reservation are preferably set to a multiple of "X", where X is selected based on the combination of the desired resolution of the DRP reservation and the size of the DRP slot. Typically, X=625 usec.

Figure 3A:
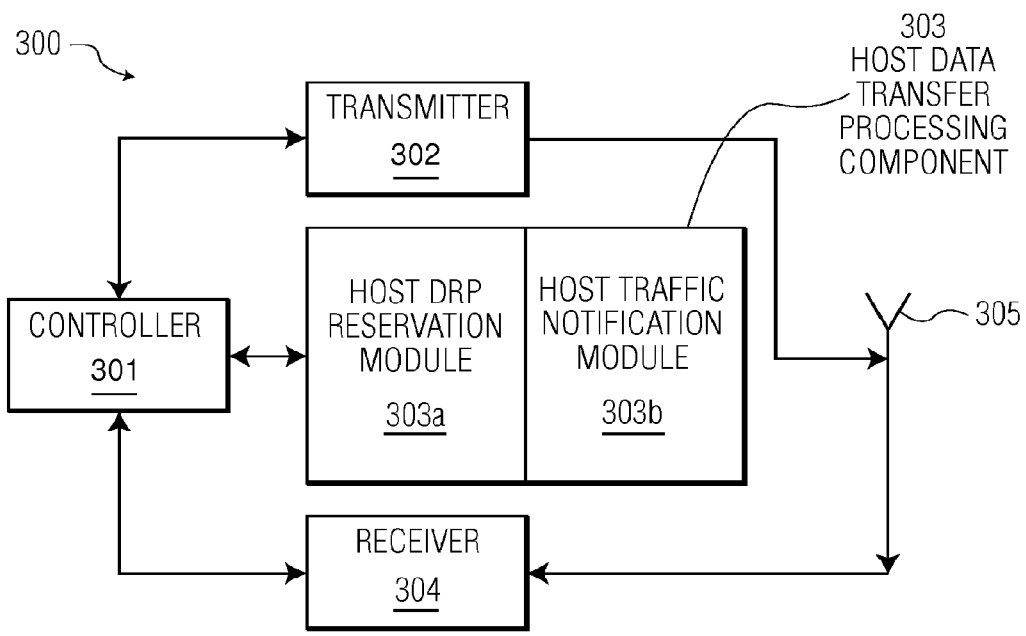
FIG. 3a illustrates an architecture of a host according to the present invention.

Referring now to FIG. 1, a typical WUSB network employs a hub-and-spoke architecture having a host 101 as the hub and at least one connected device 102 as a spoke. A typical WUSB host 101, according to the present invention, may include a host MAC module 300 with an architecture that is illustrated in the block diagram of FIG. 3*a*. A host 101 may include a host MAC module 300 having a controller 301 operatively coupled to at least a transmitter 302, a host data transfer processing component 303 comprising a host DRP processing module 303*a* and a host device notification processing module 303*b* according to the present invention, and a receiver 304. The transmitter 302 and the receiver 304 are operatively coupled to an antenna 305. The host DRP processing component 303*a* provides adaptive programming such that, for example, at least one of multicast and unicast DRP processing is accomplished by the host 101 for each connected device 102.

Figure 3B:
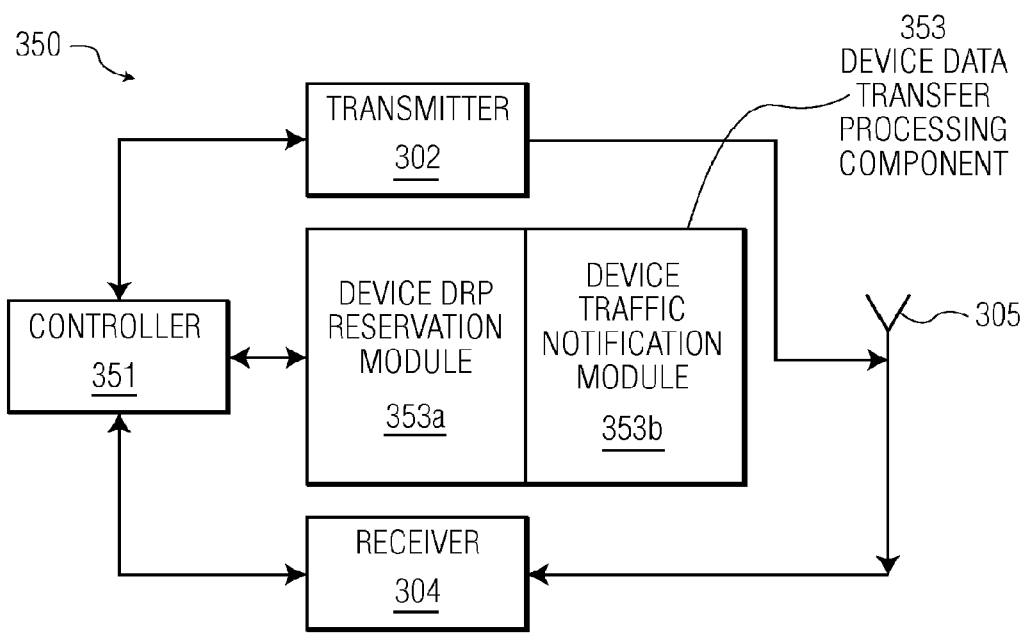
FIG. 3b illustrates an architecture of a connected device according to the present invention.

A typical WUSB connected device 102 may optionally include a more limited version of the host MAC module 300 as device MAC module 350 with an architecture that is illustrated in the block diagram of FIG. 3*b*. Each connected device 102 may include a device MAC module 350 having a controller 351 operatively coupled to at least a transmitter 302, a device processing component 353 comprising a device DRP processing module 353*a* and a device notification processing module 353*b* according to the present invention, and a receiver 304. The transmitter 302 and the receiver 304 are operatively coupled to an antenna 305. The device DRP processing component 353*a* provides adaptive programming such that, for example, at least one of multicast and unicast DRP processing is accomplished by the device 102 in response to reservations made by the host 101 and such that the connected device 102 further accepts or rejects a reservation made on its behalf by the host 101. In addition, if a connected device has additional capabilities for acting as a host itself, there is an optional device/host subcomponent (not shown), of each the modules 353*a-b*.

Figure 4:
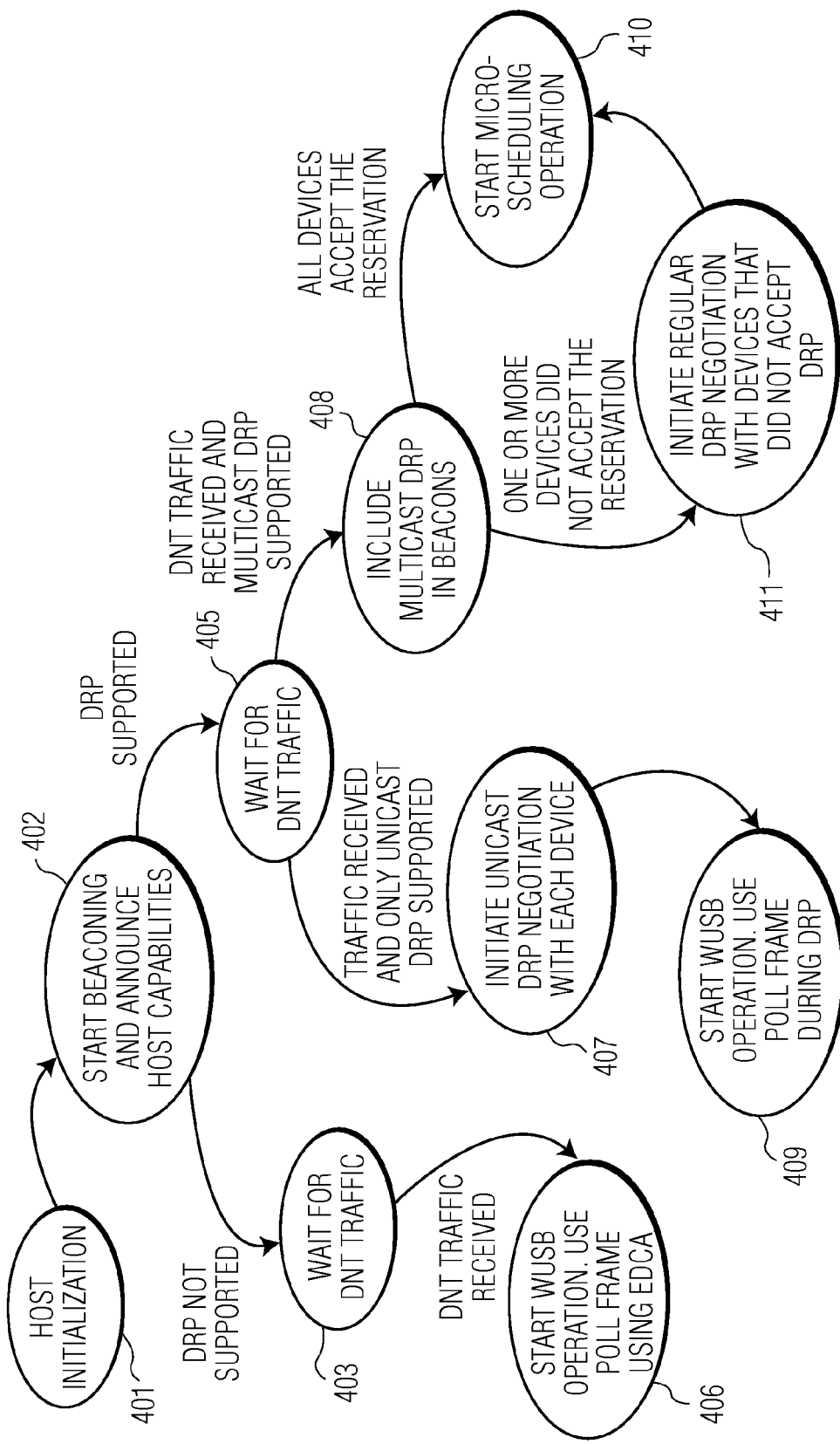
FIG. 4 illustrates a finite state diagram (FSD) for host data transfer processing.

Referring now to FIG. 4, a finite state diagram (FSD) illustrates host data transfer processing 303 including DRP reservation functionality of the host DRP processing component 303*a*. Once the WUSB host is initialized 401, it starts beaconing 402 following the rules specified in the MBOA MAC. The beacon includes the WUSB host capabilities, so that WUSB devices can find the WUSB host by means of regular MAC beacon reception. Once WUSB devices are initialized the devices follow the beaconing rules of the MBOA MAC, and look for the beacon from WUSB host(s).

The WUSB waits to receive the device notification traffic (DNT) via EDCA if DRP is not supported 403, or via EDCA or DRP if DRP is supported 405. Following the EDCA operation 403, once DNT traffic is received via EDCA, the WUSB host uses EDCA mechanisms to access the medium and to poll the WUSB devices 406 according to a third embodiment of this invention. It should be noted that DNT traffic might be received via EDCA 403 even though the WUSB host supports DRP.

If DNT traffic is received and DRP is supported WUSB host initiates the DRP data negotiation process 405.

If the WUSB host and devices support multicast DRP, the WUSB host includes a DRP multicast reservation in the beacon 408. Devices may adopt the reservation and include it in their own beacons. If all devices adopt the multicast reservation the WUSB host starts the micro-scheduling operation. If some devices do not adopt the multicast reservation, because, for example, they have a conflict with a neighbor's reservation, the WUSB host may initiate a second WUSB multicast reservation or a unicast reservation with said devices 411. In a first embodiment of the invention the WUSB devices support at least the implicit DRP reservation mechanism. This requires the devices to listen to the beacons of other devices and to store the occupancy of all data slots during the superframe. This allows the devices to eventually reject the multicast reservation request of the WUSB host and to eventually propose an alternative reservation time. In a second embodiment of the invention, the WUSB devices do not need to support the full DRP-functionality and just copy the DRP reservation information element from the beacon of the WUSB host into their own beacon.

If WUSB host or devices do not support micro-scheduling during multicast DRP reservations, the WUSB host initiates a unicast DRP negotiation 407 and starts WUSB operation by using Poll Frames during the DRP reservations 409 according to another embodiment.

It should be appreciated that, to satisfy the requirements of devices with different capabilities, a combination of all mechanisms may be performed in parallel by the WUSB. Also it is possible that the WUSB host uses EDCA access to deliver traffic or to poll connected devices 406, even though a DRP reservation was established 409 410. This is useful for scenarios were there are interferences and channel errors and the time during the DRP reservation cannot be used.

While the preferred embodiments of the present invention have been illustrated and described, it will be understood by those skilled in the art that the superframe as described herein is illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling with the scope of the appended claims.

We claim:

1. A method for host-device communication in a first Wireless Universal Serial Bus (WUSB) network including a host and at least one connected device, comprising:
   beaconing according to a distributed Ultra WideBand Medium Access Control (UWB MAC) protocol by the host and the at least one connected device;
   receiving Device Notification Traffic (DNT) by the host; and
   operating the WUSB network by the host according to the capabilities of the connected devices, wherein an offset field and a duration field in a Distributed Reservation Protocol (DRP) are set to a multiple of a predetermined value if distributed reservation is supported; wherein the predetermined value is selected based on the combination of a desired resolution of the DRP reservation and a size of the DRP slot.

2. The method of claim 1, wherein the predetermined value is 625 usec.

3. The method of claim 1, further comprising the at least one connected device performing one of the following:
   using Distributed Reservation Protocol (DRP) access to indicate traffic;
   using Enhanced Distributed Channel Access (EDCA) to send notification traffic; and
   signaling in the beacons to send notification traffic.

4. The method of claim 1, further comprising the at least one connected device discovering the host via the host beacon.

5. The method of claim 1, wherein the operating further comprises if the connected device supports Enhanced Distributed Channel Access (EDCA), the host performing:
   using an EDCA mechanism to access the medium;
   polling the at least one connected device to request that the at least one connected device transmit data; and
   receiving data from the at least one connected device as a result of the poll.

6. The method of claim 5, further comprising the at least one connected device performing one of the following:
   using Distributed Reservation Protocol (DRP) access to indicate traffic;
   using EDCA to send notification traffic; and
   signaling in the beacons to send notification traffic.

7. The method of claim 1, wherein the operating further comprises if the connected device supports Unicast Distributed Reservation Protocol (DRP), performing a Unicast reservation by the host performing:
   initiating a Unicast DRP reservation to the at least one device to reserve channel resources for transmission of data to the host by the at least one device;
   polling the at least one connected device during DRP to request that the at least one connected device transmit data; and
   receiving data from the at least one connected device at a result of the poll.

8. The method of claim 7, further comprising the at least one connected device performing one of the following:
   using DRP access to indicate traffic;
   using Enhanced Distributed Channel Access (EDCA) to send notification traffic; and
   signaling in the beacons to send notification traffic.

9. The method of claim 1, wherein the operating further comprises if the connected device supports Multicast Distributed Reservation Protocol (DRP), performing a Multicast reservation by the host performing:

reserving channel resources in a first DRP reservation by inclusion of multicast DRP in beacons to achieve a first reservation;

for each connected device that is a non-accepting device that does not accept the Multicast DRP reservation, initiating regular DRP negotiation with each non-accepting device to achieve at least one of a Unicast reservation for each non-accepting and a second DRP reservation;

micro-scheduling the channel resources of the first and second DRP reservation among those connected devices of the at least one connected device that accept the multicast DRP reservation; and receiving data from the at least one connected device.

10. The method of claim 9, further comprising the at least one connected device performing one of the following:
using DRP access to indicate traffic;
using Enhanced Distributed Channel Access (EDCA) to send notification traffic; and
signaling in the beacons to send notification traffic.

11. The method of claim 10, wherein the initiating regular DRP negotiation further comprises performing at least one of
initiating a Unicast DRP reservation with a non-accepting device and
initiating a second Multicast DRP reservation with non-accepting devices.

12. The method of claim 11, further comprising the at least one connected device acting as a host in a second WUSB network.

13. The method of claim 12, wherein the at least one connected device acting as a host of the second WUSB network performs at least some of the steps performed by the host of the first WUSB network.

14. The method of claim 9, wherein the predetermined value is 625 usec.

15. A host apparatus for host-device communication in a first Wireless Universal Serial Bus (WUSB) network including the host and at least one connected device, comprising:
a transmitter for sending beacons, traffic notifications, medium reservations and data;
a receiver for receiving beacons, traffic notifications, medium reservations and data;
a host data transfer processing component that processes data transferred between the host and the at least one connected device; and
a controller operably coupled to the transmitter, receiver and host data transfer processing component and configured to direct the transmitter, receiver and host data transfer processing component to
start beaconing according to a distributed Ultra WideBand Medium Access Control (UWB MAC) protocol and announce host capabilities,
receive and process, according to a distributed UWB MAC protocol, beacons of the at least one connected device including capabilities of the at least one device,
receive and process Device Notification Traffic (DNT traffic), and
start and control WUSB operation of the network, wherein the controller directs the device data transfer processing component to set an offset field and a duration field in each DRP reservation to a multiple of a predetermined value if distributed reservation is supported; wherein the predetermined value is selected based on the combination of a desired resolution of the DRP reservation and a size of the DRP slot.

16. The host apparatus of claim 15, wherein the controller is further configured to direct the transmitter, receiver and host data transfer processing component to:
include multicast Distributed Reservation Protocol (DRP) in beacons and then start micro-scheduling operation if multicast DRP is supported;
receive and process DNT traffic and if only unicast DRP is supported by the connected device negotiate unicast DRP with the at least one connected device and then start WUSB operation; and
receive and process DNT traffic and if only Enhanced Distributed Channel Access (EDCA) is supported by the connected device start WUSB operation with poll frame using EDCA.

17. The host apparatus of claim 15, wherein the predetermined value is 625 usec.

18. The host apparatus of claim 15, wherein when the connected device only supports Enhanced Distributed Channel Access (EDCA), the controller is further configured to control the operation of the host by directing the receiver, transmitter and host data transfer processing unit to:
use an EDCA mechanism to access the medium;
poll the at least one connected device to request that the at least one connected device transmit data; and
receive data from the at least one connected device as a result of the poll.

19. The host apparatus of claim 15, wherein the connected device supports Unicast DRP the controller is further configured to control the operation of the host by directing the receiver, transmitter and host data transfer processing unit to:
initiate a Unicast DRP reservation to the at least one device to reserve channel resources for transmission of data to the host by the at least one connected device;
poll the at least one connected device during DRP to request that the at least one connected device transmit data; and
receive data from the at least one connected device at a result of the poll.

20. The host apparatus of claim 15, wherein the at least one connected device supports multicast DRP and the controller is further configured to control the operation of the host by directing the receiver, transmitter and host data transfer processing unit to:
reserve channel resources in a first Multicast DRP reservation by inclusion of multicast DRP in beacons to achieve a first reservation;
for each said at least one connected device that is a non-accepting device that does not accept the first Multicast DRP reservation, initiate regular DRP negotiation with each non-accepting device to achieve at least one of a Unicast reservation for each non-accepting and a second DRP reservation;
micro-schedule the channel resources of the first and second DRP reservation among those connected devices of the at least one connected device that accept the multicast DRP reservation; and
receive data from the at least one connected device.

21. The host apparatus of claim 20, wherein regular DRP negotiation comprises at least one of negotiation of a Unicast DRP reservation with a non-accepting device and a second Multicast DRP reservation for non-accepting devices.

22. A method for host-device communication in a Wireless Universal Serial Bus (WUSB) network including a host and at least one connected device, comprising:
beaconing according to a distributed Ultra WideBand Medium Access Control (UWB MAC) protocol by the host and the at least one connected device;
the host establishing a multicast reservation between the host and the at least one connected device; and running a WUSB protocol inside the multicast reservation, wherein an offset field and a duration field in a Distributed Reservation Protocol (DRP) are set to a multiple of a predetermined value if distributed reservation is supported; wherein the predetermined value is selected based on the combination of a desired resolution of the DRP reservation and a size of the DRP slot.

23. The method of claim 22, wherein the establishing and running each further comprise
reserving channel resources by inclusion of a multicast reservation information element in beacons to achieve a first reservation;
micro-scheduling the channel resources of the multicast reservation among those connected devices of the at least one connected device that accepted the multicast reservation; and
receiving data from the at least one connected device.

24. The method of claim 23, wherein the reserving further comprises:
initiating a unicast reservation with a non-accepting device; and
initiating a second multicast reservation with a plurality of non-accepting devices.

25. The method of claim 22, wherein the predetermined value is 625 usec.

26. The method of claim 22, further comprising the at least one connected device performing one of the following:
using Distributed Reservation Protocol (DRP) access to indicate traffic;
using Enhanced Distributed Channel Access (EDCA) to send notification traffic; and
signaling in the beacons to send notification traffic.

27. The method of claim 26, further comprising the at least one connected device discovering the host via a host beacon.

28. A method for host-device communication in a Wireless Universal Serial Bus (WUSB) network including a host and at least one connected device, comprising:
beaconing according to a distributed Ultra WideBand Medium Access Control (UWB) MAC protocol by the host and the at least one connected device;
establishing unicast reservations between the host and the at least one connected device; and
running a WUSB protocol inside the unicast reservations; wherein when the at least one connected device performs Distributed Reservation Protocol (DRP) access to indicate traffic, the host setting an offset field and a duration field in each DRP reservation to a multiple of a predetermined value if distributed reservation is supported; wherein the predetermined value is selected based on the combination of a desired resolution of the DRP reservation and a size of the DRP slot.

29. The method of claim 28, wherein the establishing and running each further comprise
the host initiating a unicast reservation to the at least one connected device to reserve channel resources for transmission of data to the host by the at least one connected device;
the host polling the at least one connected device during the reservation to request that the connected devices transmit data; and
the at least one connected device transmitting data to the host as a result of the poll.

30. The method of claim 28, further comprising the at least one connected device performing one of the following:
using Distributed Reservation Protocol (DRP) access to indicate traffic;
using Enhanced Distributed Channel Access (EDCA) to send notification traffic; and
signaling in the beacons to send notification traffic.

31. The method of claim 30, further comprising the at least one connected device discovering the host via a host beacon.

32. A method for host-device communication in a Wireless Universal Serial Bus (WUSB) network including a host and at least one connected device, comprising:
beaconing according to a distributed Ultra WideBand Medium Access Control (UWB MAC) protocol by the host and the at least one connected device;
the host using an Enhanced Distributed Channel Access (EDCA) mechanism to access the medium;
the host polling the at least one connected device to request that the at least one connected device transmit data; and
the host receiving data from the at least one connected device as a result of the poll; wherein
when the at least one connected device performs Distributed Reservation Protocol (DRP) access to indicate traffic, the host setting an offset field and a duration field in each DRP reservation to a multiple of a predetermined value if distributed reservation is supported; wherein the predetermined value is selected based on the combination of a desired resolution of the DRP reservation and a size of the DRP slot.

33. The method of claim 32, further comprising the at least one connected device performing one of the following:
using Distributed Reservation Protocol (DRP) access to indicate traffic;
using EDCA to send notification traffic; and
signaling in the beacons to send notification traffic.

34. The method of claim 33, further comprising the at least one connected device discovering the host via a host beacon.

* * * * *